3,455,393
MODIFYING WATER INJECTION WELL
PROFILES
James R. Bradley, Tulsa, Okla., assignor to The Dow
Chemical Company, Midland, Mich., a corporation of
Delaware
No Drawing. Filed Aug. 2, 1967, Ser. No. 657,771
Int. Cl. E21b 43/20, 43/16
U.S. Cl. 166—305         3 Claims

ABSTRACT OF THE DISCLOSURE

Secondary oil recovery by water flooding is improved during late stages by modifying the injection profiles of water injection wells. More permeable intervals of the formation being flooded are treated in a special manner to decrease their injectivity and thereby relatively increase the injectivity of less permeable intervals of the same formation. The special procedure involves injecting an aqueous solution of a viscosity increasing agent with incrementally increasing concentrations of the viscosity additive. The technique yields a lasting modification of the injection profile for the treated well.

---

The technique of modifying the injection characteristics of a formation with differing porosities or permeabilities over vertical intervals was described in U.S. Patent 2,272,672. Basically, the technique therein described involved injecting into the formation a substance which acted to plug the pores of the strata. Distribution of this substance between the strata of varying permeabilities was in proportion to the injectivity of water into the given strata. With higher injectivity, more of the plugging substance was introduced. This had the effect of forcing subsequent injection water into formation intervals previously bypassed.

A number of special techniques to accomplish the objects of the above process have been developed over the years. For instance, U.S. Patents 2,604,947 and 2,976,926 describe the use of finely dispersed emulsions and viscous hydrocarbons respectively to selectively plug the more porous formation strata in injection wells. Another technique for selective plugging of formation intervals in injection wells is described in U.S. Patent 3,115,930. The technique utilizes the differences in threshold injection pressures to aid in the placement of the selective plugging agent. Injection pressures are limited to levels at which fluids containing plugging agents are injected only into the more permeable intervals of the formation.

The problem of preventing water bypassing of the less permeable strata has also been attacked with the use of viscosity additives in the flood water. The technique is illustrated by U.S. Patent 2,731,414. As described therein, this technique involves initiating water flooding by the introduction of a slug of a highly viscous aqueous solution. This solution proceeds through the formation essentially as a piston sweeping out both the high and low permeability zones. The useful aqueous flooding media will have viscosities above about 100 centipoises.

In the instant invention, it is an object to improve a water flood already in progress. In particular it is an object to modify the injection profile of water injection wells in a manner as to selectively restrict the flow in more porous intervals and to cause flooding of the less permeable zones, which may have been previously bypassed by flood water. It is a further object to provide a well treatment, which is effective for many months, but which may be accomplished in a relatively short time period, e.g., on the order of one day or so.

In accordance with the invention an improvement in the practice of secondary oil recovery by water flooding comprises treating injection wells with an aqueous solution of a viscosity additive characterized in that the concentration of the viscosity additive is incrementally increased throughout the treatment. Preferably, the concentration of the viscosity additive will be increased during the treatment by a least 5000 parts per million by weight. The injection rates are adjusted downwardly as necessary to avoid the build up of fracturing pressures. Viscosity additives of choice are the water-soluble acrylic amide polymers, i.e., water-soluble polymers containing the —$CONH_2$ moiety along the polymer chain. Better results are obtained when the additives are used in at least three incrementally increasing concentrations.

The aforedescribed method is differentiated from that described in U.S. Patent 2,731,414 in that the instant invention applies to water floding processes already in progress and in particular it is an object to abate bypassing of oil in less permeable intervals of the formation. In effect the injection profile of the injection well is reversed with the high permeability zones becoming low injection zones and the low permeability zones becoming relatively high injection zones. The incremental increasing of the viscosity additive results in a substantial and lasting restriction of flow in high injection zones with little hindrance of injection in the already low permeability zones. As a consequence the economic life of the water flood may be significantly extended.

The practice of the invention will be better understood upon consideration of the detailed application of the process to a particular injection well. A water injection well was selected in an active water flood. The well was operated at an injection rate of 0.33 barrel per minute of brine. For the purpose of initiating treatment in accordance with the invention, a polyacrylamide was dissolved in the brine in an amount of 1150 parts per million by weight. The polyacrylamide utilized was a homopolymer of acrylamide in which about 30 percent of the initially available carboxamide groups had been hydrolyzed to sodium carboxylate groups. The polymer had a molecular weight of at least about 2,000,000. The injection of this polymer solution was carried out for one hour after which the polymer concentration was raised to 2110 parts per million. Later, the polymer concentration was increased several more times over the period of the entire treatment which was about 17.5 hours.

At the completion of the treatment, an injection profile was obtained in the treated interval by lowering a flowmeter into the well, measuring the flow of brine into the formation at all intervals where liquid was entering the formation and noting the depth of the interval.

The complete treatment schedule and results are set forth in the following Tables I and II, respectively.

TABLE I.—TREATMENT SCHEDULE

| Time interval (hrs.) | Concentration viscosity additive (p.p.m.) | Injection rate (bbl./min.) |
|---|---|---|
| 0 | | 0.33 |
| 0.67 | 1,150 | 0.36 |
| 1.0 | 2,110 | 0.37 |
| 2.0 | 3,100 | 0.37 |
| 1.0 | 4,100 | 0.37 |
| 1.0 | 5,150 | 0.37 |
| 0.5 | 6,180 | 0.37 |
| 1.0 | 9,280 | 0.35 |
| 1.5 | 9,800 | 0.29 |
| 4.5 | 9,920 | 0.29 |
| 4.3 | 11,200 | 0.29 |

TABLE II.—INJECTION PROFILE

| Formation interval (depth) | Injection rate | |
|---|---|---|
| | Prior to treatment, percent input | After treatment, percent input |
| 2,190'–2,205' | 53 | 4 |
| 2,205'–2,215' | 0 | 29 |
| 2,215'–2,225' | 16 | 35 |
| 2,225'–2,230' | 0 | 0 |
| 2,230'–2,240' | 31 | 32 |

The foregoing illustrates how the invention may be applied to modify injection profiles of water injection wells during the later stages of the flooding process to cause flooding of the less permeable zones. Injection profiles obtained on wells treated in a manner similar to the foregoing have shown effective retention of the modified injection profile for periods of 6 months and more.

During the injection of the polymer solution, the pressure required to effect the injection gradually rose; after the polymer had been injected, the pressure required to inject brine was about 75 p.s.i. higher than at the beginning, for a comparable flow rate. This additional pressure was required because the brine was entering less permeable formation intervals than before the polymer was applied.

Although it is preferable to carry out the process at injection pressures within 100 p.s.i. of the normal well operating pressures by compensating for the increases in the concentration of viscosity additive by lowering injection rates, any pressure up to the fracturing pressure for the formation may be utilized if desired.

Viscosity additives include any of the water-soluble polymers (natural and synthetic), water-soluble metal soaps and simple organic compounds such as glycerine and sugar. The property required is the ability to thicken the injection fluids. Depending upon the type of flooding operation, injection fluids may include natural and conditioned waters, oilfield brine and sea water. The polymeric thickeners include the natural and modified gums such as gum Arabic and Karaya, dextran, methyl, hydroxyethyl and carboxymethyl cellulose ethers, polystyrene sulfonate, styrene-maleate copolymers, sodium and potassium polyacrylate, polyethylene oxide, polyvinyloxazolidone, polyvinyl-pyrrolidone, and polyvinylalcohol.

Particularly preferred are the acrylic amide polymers such as polyacrylamide, and copolymers such as acrylamide-acrylate (alkali metal salts), acrylamide-methylacrylic acid, and acrylamide-aminoethyl acrylate, acrylamide-methyl methacrylate.

What is claimed is:

1. In a process for secondary oil recovery comprising introducing into the oil bearing formation through an injection well penetrating said formation, an aqueous drive fluid, the improvement which consists in injecting a viscous aqueous solution in which the concentration of a viscosity additive is increased by at least 5000 parts per million by weight over the period of time said viscous aqueous solution is injected, the amount of such additive and the injection rate being adjusted as necessary to maintain injection pressures below the fracturing pressure of the oil bearing formation.

2. A method as in claim 1 wherein the injection rate is adjusted downwardly as necessary to maintain any increase in injection pressure below about 100 pounds per square inch.

3. A method as in claim 1 wherein the viscosity additive is a water-soluble acrylic amide polymer.

References Cited

UNITED STATES PATENTS

| | | | |
|---|---|---|---|
| 2,341,500 | 2/1944 | Delting. | |
| 2,731,414 | 1/1956 | Binder et al. | 252—8.55 |
| 2,827,964 | 3/1958 | Sandiford et al. | 166—9 |
| 3,039,529 | 6/1962 | McKennon | 166—9 |
| 3,053,765 | 9/1962 | Sparks | 166—9 |
| 3,167,118 | 1/1965 | Habermann | 166—9 |
| 3,208,518 | 9/1965 | Patton | 166—9 |
| 3,292,696 | 12/1966 | Sandiford | 166—9 |
| 3,308,885 | 3/1967 | Sandiford | 166—9 X |
| 3,336,977 | 8/1967 | Amott | 166—9 |
| 3,367,418 | 2/1968 | Routson | 166—9 |

STEPHEN J. NOVOSAD, Primary Examiner

U.S. Cl. X.R.

166—268